United States Patent [19]

Semenenko

[11] Patent Number: 5,743,439
[45] Date of Patent: Apr. 28, 1998

[54] CLAMPING DEVICE AND CONTAINER HAVING A CLOSURE DEVICE SECURED IN POSITION BY THE CLAMPING DEVICE

[75] Inventor: Ivan Semenenko, Moreton-in-Marsh, United Kingdom

[73] Assignee: Matcon Limited, Moreton-in-Marsh, United Kingdom

[21] Appl. No.: 500,057

[22] Filed: Jul. 10, 1995

[30] Foreign Application Priority Data

| Jul. 11, 1994 | [GB] | United Kingdom | 9413914 |
| Jul. 11, 1994 | [GB] | United Kingdom | 9413922 |
| Jul. 11, 1994 | [GB] | United Kingdom | 9413929 |
| Nov. 29, 1994 | [GB] | United Kingdom | 9424097 |
| Dec. 19, 1994 | [GB] | United Kingdom | 9425532 |

[51] Int. Cl.$^6$ ...................................................... B67D 5/06
[52] U.S. Cl. .......................... 222/185.1; 141/46; 141/369; 141/382
[58] Field of Search ..................... 222/185.1; 141/46, 141/369, 370, 372, 382, 384, 386

[56] References Cited

U.S. PATENT DOCUMENTS 2,281,727  5/1942  Stewart ............................... 141/370 X

FOREIGN PATENT DOCUMENTS

| 0 092 008 | 10/1983 | European Pat. Off. . |
| 38 42 549 | 6/1990 | Germany . |
| 43 29 276 | 3/1995 | Germany . |
| 2 112 363 | 7/1983 | United Kingdom . |
| 2 262 514 | 6/1993 | United Kingdom . |

*Primary Examiner*—Gregory L. Huson
*Attorney, Agent, or Firm*—Shapiro and Shapiro

[57] ABSTRACT

An outlet closure element in the embodiment is a metal or other material, e.g., plastic, plate which is circular in plan, formed in one piece and which has a substantially central frusto-conical upwardly directly (as considered in use) inset or profile. The periphery of the rim element has a plurality of projecting interengaging portions, in the embodiment four, equiangularly spaced, bayonet shaped locators or slots for releasable interengaging cooperation with members in the form of four bayonet kind of lugs located on the periphery of the outlet of the container.

12 Claims, 8 Drawing Sheets

CLAMPING DEVICE AND CONTAINER HAVING A CLOSURE DEVICE SECURED IN POSITION BY THE CLAMPING DEVICE

BACKGROUND OF THE INVENTION

1. Field of the Invention

The invention relates to material handling apparatus, generally having a tapering outlet hopper at its base closable by a closure or valve which is moved into the wider region of the hopper to allow discharge of flowable material, which may or may not be toxic. The material is usually a powder, pellets or the like flowable material.

2. Description of the Related Art

In the transport, storage and general handling of flowable material such as powder, particulate material, granules and the like, it is nowadays usual for such materials to be held in bins, containers, hoppers, solos, or intermediate bulk containers (I.B.C.'s). Such containers have a filling inlet and a discharge outlet. The outlet is often of hopper configuration, and is usually obturated by a closure device which is substantially conical or frusto-conical and, nowadays, is often made of plastic. The cone in the obturating position rests on the inner (in use) surface of the outlet hopper. At a discharge or transfer station, the closure device is raised from the hopper outlet by suitable means, such as a bellows device marketed under the registered trade mark MATCON®, to open an annular discharge opening between the hopper outlet and the closure device through which a desired amount of the flowable material can pass to other stations for During transport or even storage of an IBC containing material, it is important that the closure device be firmly clamped in position. It is also important that members used to effect such clamping can do so by manual application and also that such clamping, fitting or removing of the closure device can be carried out without operatives physically entering below the IBC, which would be contrary to usual employment, and safety at work, regulations.

In handling and transport of such containers, when full of material, it is necessary often to ensure positive locking of the cone valve because otherwise the cone can be dislodged in certain handling situations, which can not only cause loss of valuable product, but which can be environmentally detrimental as the product is often dangerous or toxic.

SUMMARY OF THE INVENTION

The outlet of the container is normally closed by a sealable cone valve which has a depending seal ring. This cone valve is required to be raised by an actuator at a discharge station in order to discharge material. During periods of non-discharge, it is often necessary to seek to obviate non-desirable movement of the cone valve as described before.

Also, the invention provides a cone clamp, particularly such a clamp for a closure of substantially conical or frusto-conical form which is used to obturate a discharge opening of a transportable container for flowable material. Such material is often in particulate form, being a fine powder such as flour, cement or the like, pellets such as animal feed, granules or the like. Such material is required to be supplied to an end user by a producer or supplier, and, increasingly, environmental considerations are such that the material has to be contained in a transport container. Also, from the point of view of cost, it is essential that an outlet of the container be safely and securely closed during transport so that there is no dislodgement thereof and the material is not wasted by being spilled and so that it does not escape and contaminate the surroundings. On the other hand, the closure must be readily operable to clear the opening at the point of use, so it must be relatively simple and light for raising (and lowering). This makes it relatively easy to dislodge, and prior cones have been prone to this disadvantage.

According to the invention there is provided a member adapted to be mounted at an aperture of a container for flowable material, comprising means resiliently to engage the container whereby to clamp the closure in the aperture.

There may be a container with an outlet having a generally circular rim at its base and a valve for closing the outlet, the valve may be provided with a generally circular resilient seal ring for engaging the rim of the outlet, and the ring may be deformable from a natural position to a deformed position, the outlet and the seal ring engaging at least to hinder movement of the valve from its state closing the outlet in one of said positions of the ring and allowing the valve to open in the other of said positions of the ring.

In said other position the seal ring may have a smaller "radius" in all directions than the outlet, whereas in said one position the ring has greater radii at some points so that the ring cannot move, or at least is hindered from moving, "axially" relative to the outlet due to its engagement with the outlet at those points. In the one position the ring may have a plurality of exterior lobes extending outside its general circular shape which lobes are drawn inwards in the other position, thereby disengaging from the outlet.

As a fail-safe procedure, it is preferable that said one position is the natural position to which the ring resides. Preferably means is provided to engage the inside and/or the outside of the ring to move it from its natural position to its deformed position, but it would be possible to arrange for example by so chamfering of the engaging surfaces that simply the application of an axial force to the ring when in the position to close the outlet would cause reactions which deform the ring to the position in which it could move to open the outlet. With this arrangement, the engagement of the sealing ring and the outlet only hinders the movement of the valve from its closed state. If the ring were then moved axially back again, its resilience would return it to said one position.

Preferably sealing means is provided between the ring and the outlet to provide a seal therebetween against passage of the container contents through the closed outlet.

BRIEF DESCRIPTION OF THE DRAWINGS

Apparatus according to the invention is hereinafter described with reference to the accompanying drawings.

DETAILED DESCRIPTION OF THE PREFERRED EMBODIMENTS

Figures 1, 1A, 2:
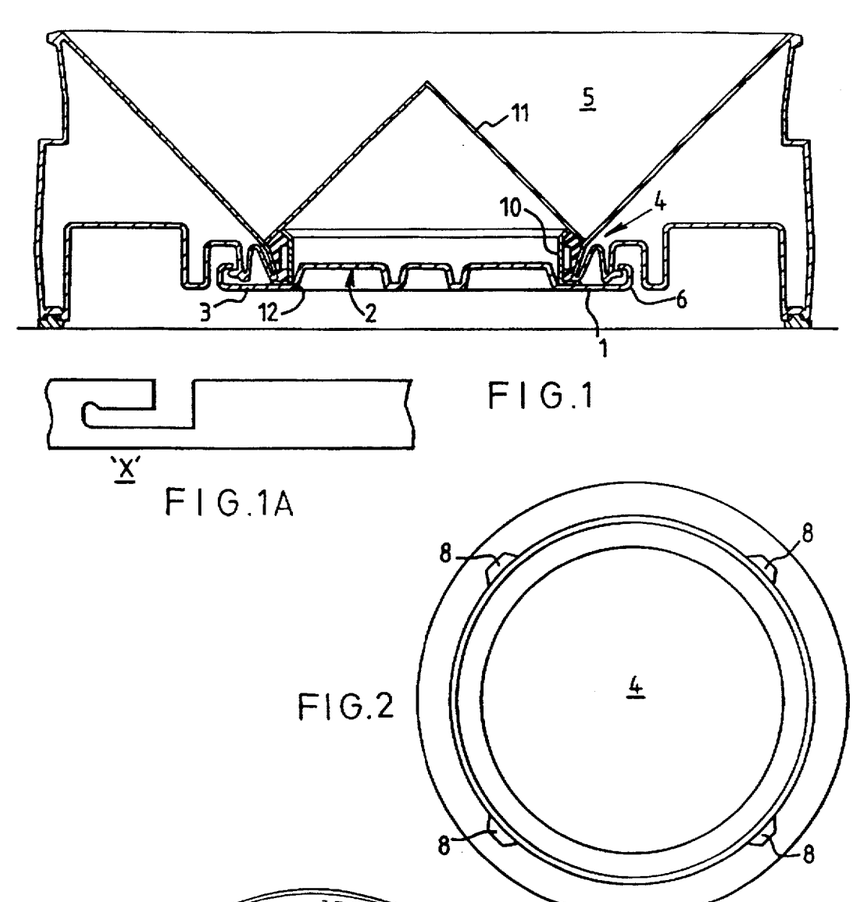
FIG. 1 is a transverse section through a base of a container for flowable particulate material showing its cone valve and an outlet closure element in position and according to the invention.
FIG. 1A is an enlarged view of a bayonet location.
FIG. 2 shows a plan view from below the outlet of the container, with the closure element and cone omitted for clarity.
Figure 3:
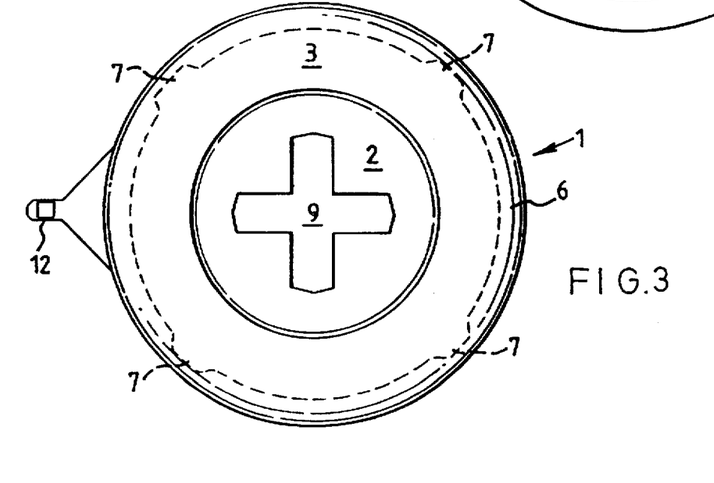
FIG. 3 shows a plan view of the outlet closure element.

Referring to FIGS. 1 to 3 of the drawings, there is shown an outlet closure element 1 which in the embodiment is a metal or other material e.g. plastic plate 1 which is circular in plan, formed in one piece and which has a substantially central frusto-conical upwardly directly (as considered in use) inset or profile 2.

The periphery of the fit 6 element has a plurality of projecting interengaging means, in the embodiment four, equiangularly spaced, bayonet shaped locators or slots 7 releasable interengaging cooperation with means in the form of four bayonet kind of lugs 8 located on the periphery of the outlet of the container. An enlarged detail of the bayonet locations is shown in FIG. 1A 'X'.

It will be understood that the bayonet locators 7 may be on the outlet 4 and the lugs 8 on the outlet closure element 1. Them is centrally of the frusto-conical element, a cruciform inset or key 9 for cooperation with a male member of similar cross-section (not town) and which automatically locks and unlocks the element 1 at the discharge station (or a locking/interlocking station adjacent the discharge station).

In alternative embodiments not shown, the cruciform inset 9 may be replaced by a downwardly drawn square tube for cooperation with a suitable tool for rotation at the discharge or other station, or there may be opposed extension arms for rotation for locking and unlocking, in the matter of a capstan. In use, the outlet closure element 1 is offered up to the container outlet 4 with the interengaging bayonet lugs 8 and locators 7 engaged so that on rotation, either by machine or manually, the outlet closure element is locked securely in position. In this position, the frusto-conical element 2 is located and engaged snugly within a seal ring 10 of the cone valve 11, FIG. 1, so that any tendency of the cone valve 11 to move is prevented as the inclined annular surface 12 of the frusto-conical element 2 always forces the ring 10 to the outside even if it tries to ride up or tilt. Thus there is no distortion of the ring 10 so that there is no upward movement which would otherwise dislodge the cone valve. Therefore the material is maintained inside the container, even if the container tilts or fails over. This provides full locking of the cone valve 11, a weather-proof cover, which keeps the environment clean, and also does not hinder use of forks of a fork-lift truck as the element is essentially in the same plane as the outlet. The container is also tamper proof, there being a locking eye for a wire which is locked in position during transport.

Figure 4:
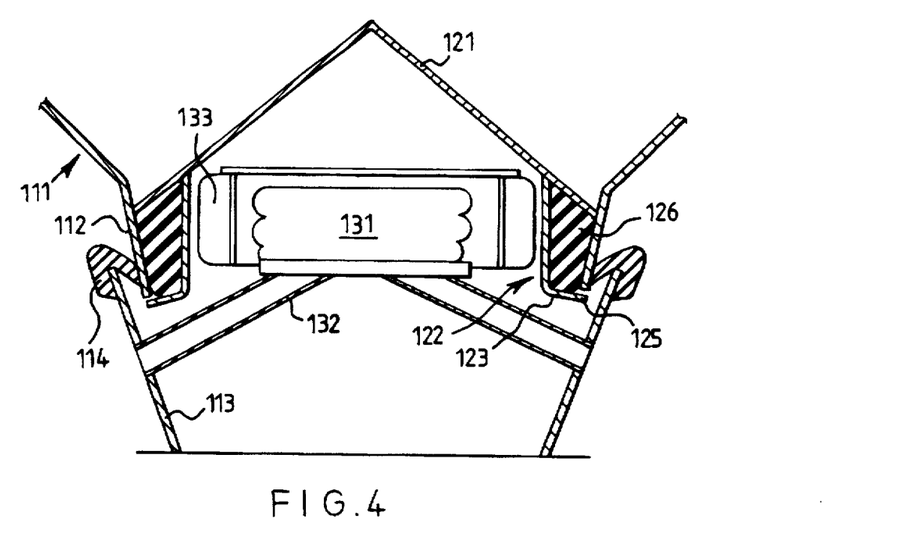
FIG. 4 is a diagrammatic diametral section through a cylindrical container of the invention.
Figures 5, 5A:
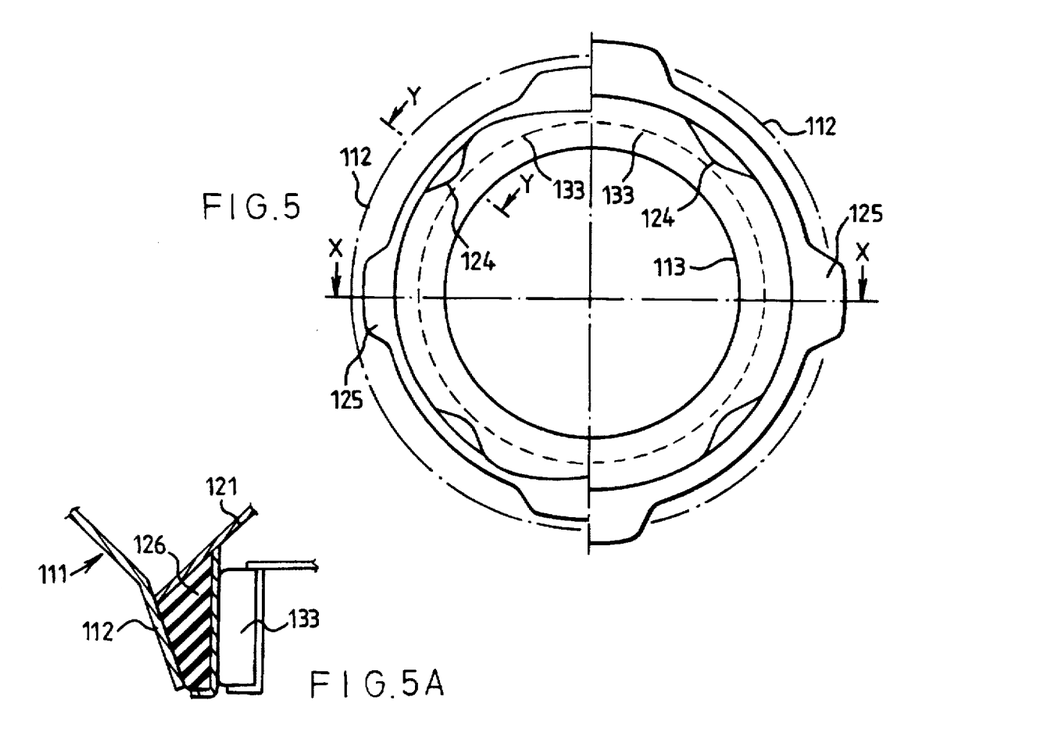
FIG. 5 is a diagrammatic diametral section through the sealing ring of FIG. 4 above the level of the flange.
FIG. 5A is an enlarged section taken along line Y—Y of FIG. 5.

Referring now to FIGS. 4–5A of the drawings, there is shown a container for flowable particulate material has a tapered or hopper outlet 111 tapered at an angle of about 45 degrees (the angle can be varied according to the properties of the material contained) and an outlet rim 112 at the base of the outlet 111 tapered at an angle of about 15 degrees. When it is desired to empty the container, the outlet rim 112 is sealed onto an inlet chute 113 of a discharge station by a sealing ring 114 extending over the top edge of the discharge station chute 103 and engaging the outside of the outlet rim 112.

The container, which may be a bin, hopper, silo, intermediate bull container (IBC) or the like has its outlet portion normally closed by a cone valve 121 whose periphery rests on the tapering inside of the outlet rim 112. The outlet 111 is opened to passage of the contents of the container by lifting the cone valve 121 relative to the outlet portion. The cone valve 121 has a ring seal 122 of resilient material extending downwards near its bottom edge, the seal having an outwardly directed flange 123 which can extend under the bottom edge of the outlet rim to prevent or at least hinder the cone valve moving upwards. The interior of the outlet rim and the exterior and interior of the ring seal are all generally circular but in this case only the outlet rim and the base of the interior of the ring seal are normally exactly circular. Above the level of the flange 123, the interior of the ring seal has a plurality of inwardly directed lobes 124 and the periphery of the flange on the exterior of the ring seal has four outwardly directed lobes 125 located intermediate the inwardly directed lobes 124 on the interior of the seal. In the natural position of the ring seal, the lobes 124, 125 extend respectively inwards and outwards from the generally circular shape of the ring and the outward lobes 125 extend under the outlet rim 112 as shown on the right hand side of FIG. 4. A ring 126 of elastomeric sealing material encircles the ring 122 between the periphery of the cone and the flange 123 to seal against the outlet rim 112 when the valve is closed.

A valve actuator 131 is mounted in the top of the inlet chute 113 of the discharge station. As the container is lowered onto the discharge station, the actuator 131 enters the interior of the ring seal 123. The actuator comprises a central core 132 and an inflatable tire, 133 encircling the core. When the actuator is in position inside the ring seal, the tire 133 is inflated and presses the inwards lobes 124 outwards, deforming the ring seal so that the outwardly directed lobes 125 are correspondingly drawn inwards, within the radius of the bottom edge of the outlet ring, thus releasing the cone valve to be raised by the actuator to allow material in the container to flow through the outlet 111. FIG. 5A and the left hand side of and 5 show the tire 133 inflated, which has caused the lobes 125 to be withdrawn from the rim 112 of the outlet. It should be understood that outward movement of the tire 133 is converted to inward movement of the lobe 125, since the tire 133 forces the inward lobe 124 outwards and this distorts the ring 123 to cause inward movement of the lobe 125.

The tire 133 on its core 132 is circular, so there is no need to orient the actuator 131 relative to the valve before the system is operated. The valve may rotate relative to the hopper during use, but the inflation of the tire will be effective to withdraw the ring lobes whatever the relative orientation of the ring seal.

The right hand side of FIG. 5 shows the ring 123 in its normal position. The lobes 125 extend radially outwards beyond the line of the rim 112; the lobes 124 are not contacted by the uninflated tire 133. The inner ring 113 marks the bottom end of the inlet chute of the discharge station. The left hand side shows the inflated tire 133 engaging the lobes 124, distorting the ring 123 so that the lobes 125 are drawn inwards within the line of the rim 112. If the engaging portions of the flange and the bottom of the outlet rim are suitably chamfered, it may be possible to open the cone simply by applying upwards pressure on the cone valve, the reaction at the chamfered surfaces forcing the outwardly directed lobes inwards so that the cone valve can move upwards although hindered by the engagement of the lobes 125 with the outlet rim 112. However the friction of the engaging surfaces is likely to create particles of contamination from them which will mix with the contents of the container, and so this arrangement is not desirable when high purity standards apply.

In every embodiment, the cone valve 121 is an automatically self-locking cone valve, the seal ring being a true circle over most of its depth, except near its free edge where it is formed with the lobes. The valve 121 of the invention is a plastic member fully moulded in one piece with the inner ring seal and the lobes at the bottom as viewed. This Cone valve is relatively light, flexible and inexpensive as compared with previous relatively heavy, rigid and expensive metal cones (some 22 Kg in weight) which have to be wedged in the outlet to maintain them in place. However, these prior cones also can be dislodged, can grind trapped material owing to their weight, and require a locking cap which has to be removed when discharge is required. The plastic (or other relatively flexible and lightweight) cone valve embodying the invention seeks to obviate these disadvantages in that the plurality of inwardly and outwardly directed lobes operate on flexing of the ring by the tire as it deflates or inflates automatically to engage and disengage the cone valve from the outlet and this provides a stable outlet seal having the advantages mentioned.

Stated in another way, the inner vertical seal ring of the cone valve is circular, so the inflated tire grips it internally when inflated then an actuator at the discharge lifts; the plurality, suitably four, of peripheral lugs slide and are forced inwards by the hopper outlet to allow the valve to raise. Similarly they slide outwards again when the actuator pulls down.

The inner vertical seal ring of the cone valve has a plurality, suitably four, lobes inwards; thus when the tire expands it forces these lobes outwards (flexing at the connection to the cone valve) and thus the four lugs move inwards as the inner cone ring has now been forced out of shape.

This has two advantages, namely as there no sliding friction between the lugs and outlet there is no abrasion and wear ensuring no particles are ground off to contaminate the bulk product and the actuator may be single acting (up only) returning down when exhausted as there is no force required to pull and force the valve down.

Figure 6:
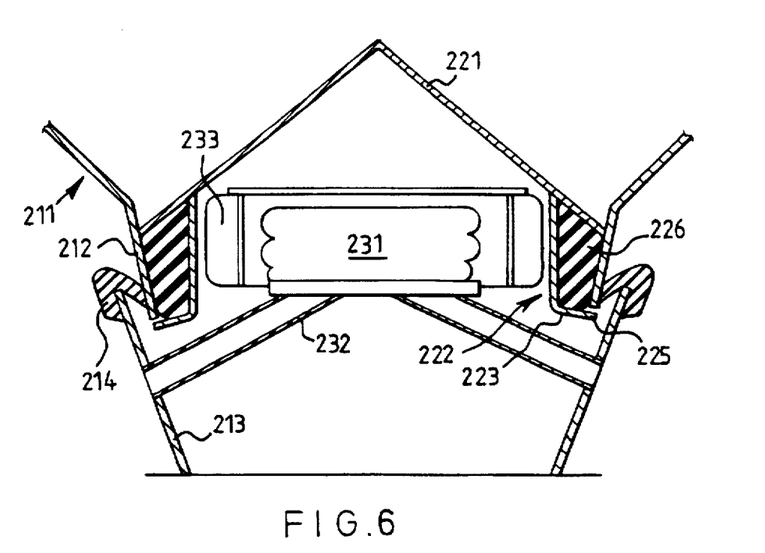
FIG. 6 is a diagrammatic diametral section through a cylindrical container of the invention.
Figures 7, 7A:
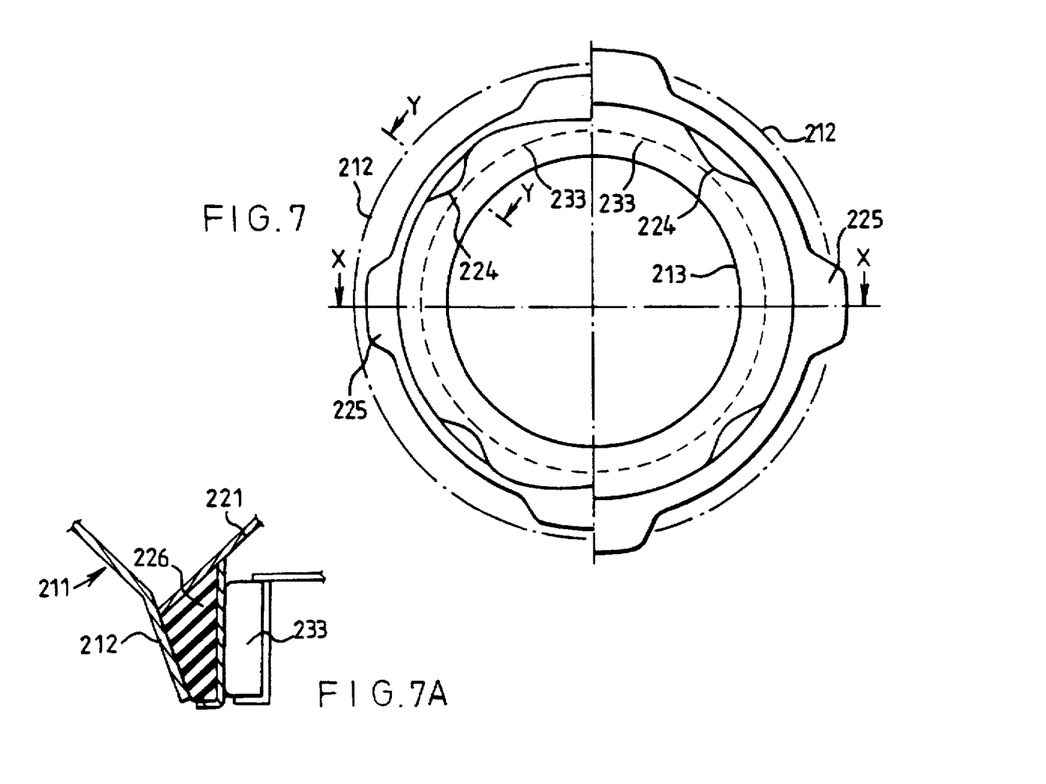
FIG. 7 is a diagrammatic diametral section through the sealing ring of FIG. 6 above the level of the flange.
FIG. 7A is an enlarged section taken along line Y—Y of FIG. 7.

Referring now to FIGS. 6–7A of the drawings, there is shown a container for flowable particulate material has a tapered outlet 211 tapered at an angle of about 45 degrees (the angle can be varied according to the properties of the material to be contained) and an outlet rim 212 at the base of the outlet 211 tapered at an angle of about 15 degrees. When it is desired to empty the container, the outlet rim 212 is sealed onto an inlet chute 313 of a discharge station by a sealing ring 214 extending over the top edge of the discharge station chute 213 and engaging the outside of the outlet rim 212.

The container, which may be a bin, hopper, silo, intermediate bulk container (IBC) or the like has its outlet portion normally closed by a cone valve 221 whose periphery rests on the tapering inside of the outlet rim 212. The outlet 211 is opened to passage of the-contents of the container by lifting the cone valve 221 relative to the outlet portion. The cone valve 221 has a dug seal 222 of resilient material extending downwards near its bottom edge, the seal having an outwardly directed flange 223 which can extend under the bottom edge of the outlet rim to prevent or at least hinder the cone valve moving upwards. The interior of the outlet rim and the exterior and interior of the dug seal are all generally circular but in this case only the outlet rim and the base of the interior of the dug seal are normally exactly circular. Above the level of the flange 223, the interior of the ring seal has a plurality of inwardly directed lobes 224 and the periphery of the flange on the exterior of the dug seal has four outwardly directed lobes 225 located intermediate the inwardly directed lobes 224 on the interior of the seal. In the natural position of the dug seal, the lobes 224, 225 extend respectively inwards and outwards from the generally circular shape of the ring and the outward lobes 225 extend under the outlet rim 212 as shown on the fight hand side of FIG. 6. A dug 226 of elastomeric sealing material encircles the dug 222 between the periphery of the cone and the flange 223 to seal against the outlet rim 212 when the valve is closed.

Figure 8A:
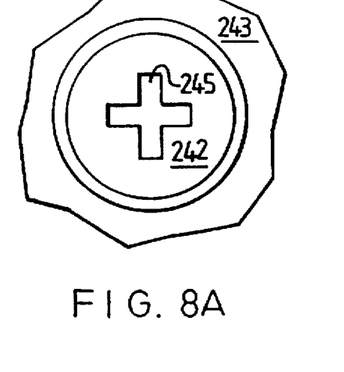
FIGS. 8A to 8C show details of the section of the apparatus of FIG. 1 removed from a discharge station with a cap in position.
Figure 8B:
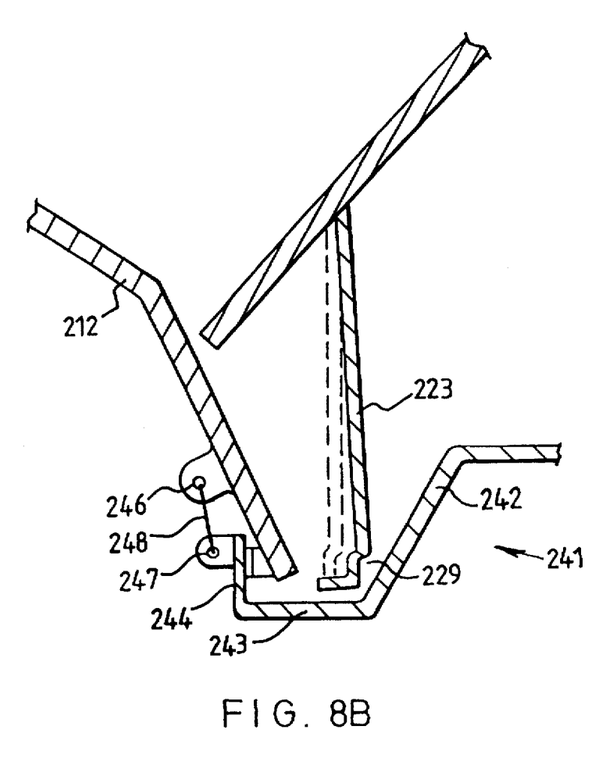
Figure 8C:
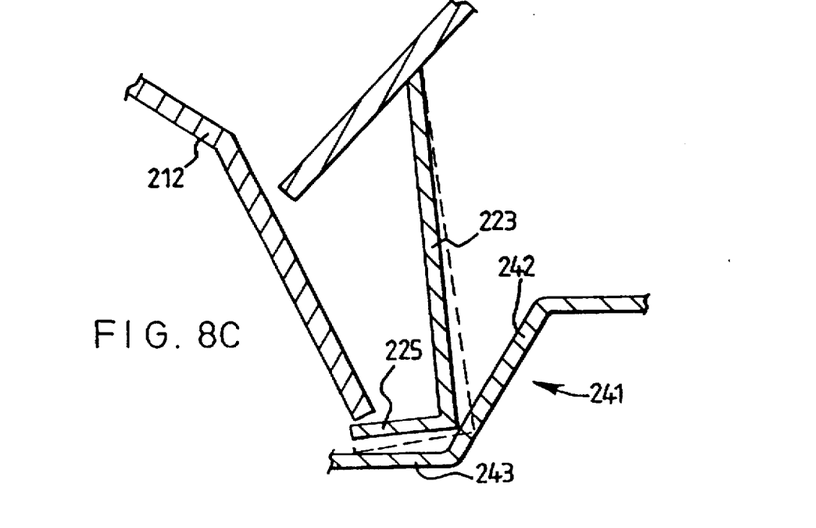

A valve actuator 231 is mounted in the top of the inlet chute 213 of the discharge station. As the container is lowered onto the discharge station, the actuator 231 enters the interior of the dug seal 223. The actuator comprises a central core 232 and an inflatable tire 233 encircling the core. When the actuator is in position inside the ring seal, the tire 233 is inflated and presses the inwards lobes 224 outwards, deforming the ring seal so that the outwardly directed lobes 225 are correspondingly drawn inwards, within the radius of the bottom edge of the outlet ring, thus releasing the cone valve to be raised by the actuator to allow material in the container to flow through the outlet 211. FIG. 7A and the left hand side of FIGS. 6 and 7 show the tire 233 inflated, which has caused the lobes 225 to be withdrawn from the rim 212 of the outlet. It should be understood that outward movement of the tire 233 is convened to inward movement of the lobe 225, since the tire 233 forces the inward lobe 224 outwards and this distorts the ring 223 to cause inward movement of the lobe 225. In the of FIG. 8B, the lobe 224 is shown stopping short at 229 of the base of the ring 223 to avoid any interference with a locking cap 241 to be described below. FIG. 8B shows a section through the sealing ring at the position of the lobe 224, in full lines when the tire is deflated and in dotted lines when it is inflated. The flange has no lobe 225 at this section line and so in neither state of the tire does it engage the underside of the outlet rim 212. In FIG. 8C the normal position of the ring and uninflated state of the tire is shown in full lines where the lobe 225 engages the underside of the rim 212, but in the other position in dotted lines the lobe 225 is withdrawn from the rim 212.

The tire 233 on its core 232 is circular, so there is no need to orient the actuator 231 relative to the valve before the system is operated. The valve may rotate relative to the hopper during use, but the inflation of the tire will be effective to withdraw the ring lobes whatever the relative orientation of the ring seal.

The right hand side of FIG. 7 shows the ring 223 in its normal position. The lobes 225 extend radially outwards beyond the line of the rim 212; the lobes 224 are not contacted by the uninflated tire 233. The inner ring 213 marks the bottom end of the inlet chute of the discharge station. The left hand side shows the inflated tire 233 engaging the lobes 224, distorting the ring 223 so that the lobes 225 are drawn inwards within the line of the rim 212. If the engaging portions of the flange and the bottom of the outlet rim are suitably chamfered, it may be possible to open the cone simply by applying upwards pressure on the cone valve, the reaction at the chamfered surfaces forcing the outwardly directed lobes inwards so that the cone valve can move upwards although hindered by the engagement of the lobes 225 with the outlet rim 212. However the friction of the engaging surfaces is likely to create particles of contamination from them which will mix with the contents of the container, and so this arrangement is not desirable when high purity standards apply.

When the container is not located at the discharge station, the outlet rim 212 with the cone valve in place is covered by a sealing cap 241 also shown in FIGS. 8B and 8C. This has a central frusto-conical upstand 242 which engages the inner surface of the sealing ring 222 to prevent any inwards movement of the ring which might allow the ring to disengage from the outlet rim and thus allow the valve to open and release contents of the container. Outside the upstand, the cap has a flat annular portion 243 which lies under the lower edge of the outlet. Outside the annular portion, the cap has an upturned rim 244 formed with bayonet sockets which engage lugs on the periphery of the outlet 212 to secure and release the cap 241 relative to the outlet as the cap is turned one way or the other. The centre of the cap may be formed with a turning key 245 which a machine may engage to release and remove the cap ready for discharge of the contents of the container when the valve is opened, and to replace the cap after the discharge is complete.

Between eyes 246, 247 formed in the cap and the container base a locking tie 248 with a lead seal may be provided to detect any unauthorised removal of the cap during transportation of the container.

In FIG. 8B the upstand of the cap 241 rises behind the ring 223 in its normal position and has no effect when it moves forward to its deformed position. In FIG. 8C, the upstand rises behind the normal position of the ring 223 as in the other view, but this time the deformation of the ring involves radially inward movement of the ring which is prevented by the upstand of the cap 241. The upstand thus locks the valve closed by preventing the lobe 225 from disengaging the rim 212.

In every embodiment, the cone valve 221 is an automatically self-locking cone valve, the seal ring being a true circle over most of its depth, except near its free edge where it is formed with the lobes. The valve 221 of the invention is a plastic member fully moulded in one piece with the inner ring seal and the lobes at the bottom as viewed. This cone valve is relatively light, flexible and inexpensive as compared with previous relatively heavy, rigid and expensive metal cones (some 22 Kg in weight) which have to be wedged in the outlet to maintain them in place. However, these prior cones also can be dislodged, can grind trapped material owing to their weight, and require a locking cap which has to be removed when discharge is required. The plastic (or other relatively flexible and lightweight) cone valve embodying the invention seeks to obviate these disadvantages in that the plurality of inwardly and outwardly directed lobes operate on flexing of the ring by the tire as it deflates or inflates automatically to engage and disengage the cone valve from the outlet and this provides a stable outlet seal having the advantages mentioned.

Stated in another way, the inner vertical seal ring of the cone valve is circular, so the inflated tire grips it internally when inflated then an actuator at the discharge lifts; the plurality, suitably four, of peripheral lugs slide and are forced inwards by the hopper outlet to allow the valve to raise. Similarly they slide outwards again when the actuator pulls down.

The inner vertical seal ring of the cone valve has a plurality, suitably four, lobes inwards; thus when the tire expands it forces these lobes outwards (flexing at the connection to the cone valve) and thus the four lugs move inwards as the inner cone ring has now been forced out of shape.

This has two advantages, namely as there is no sliding friction between the lugs and outlet there is no abrasion and wear ensuring no particles are ground off to contaminate the bull product and the actuator may be single acting (up only) returning down when exhausted as there is no force required to pull and force the valve down.

Referring now to FIGS. 9 to 18C of the drawings, there is shown a member 301 for retaining a further member 302 (shown in FIGS. 19 to 21) in connection therewith, comprising a body 303 having two projections 304, 305 spaced apart in a direction of the length of the body 303, whereby to engage a latching part 306 of the further member 302 and to connect the members 301,302 together.

The member 301 is made in one piece from a suitable material such as metal or plastic, the body 303, being generally cylindrical (though it could be frusto-conical) and the projections 304, 305 being annular ring-like projections projecting externally of the body 303 and being formed integrally therewith. The direction of the length of the body 303 coincides with the axis of revolution of the body, 'Z' in FIG. 9, and is in a direction away from a base in the form of a laterally extending flange 307 of the member 301.

Figures 9, 10, 11, 12, 14:
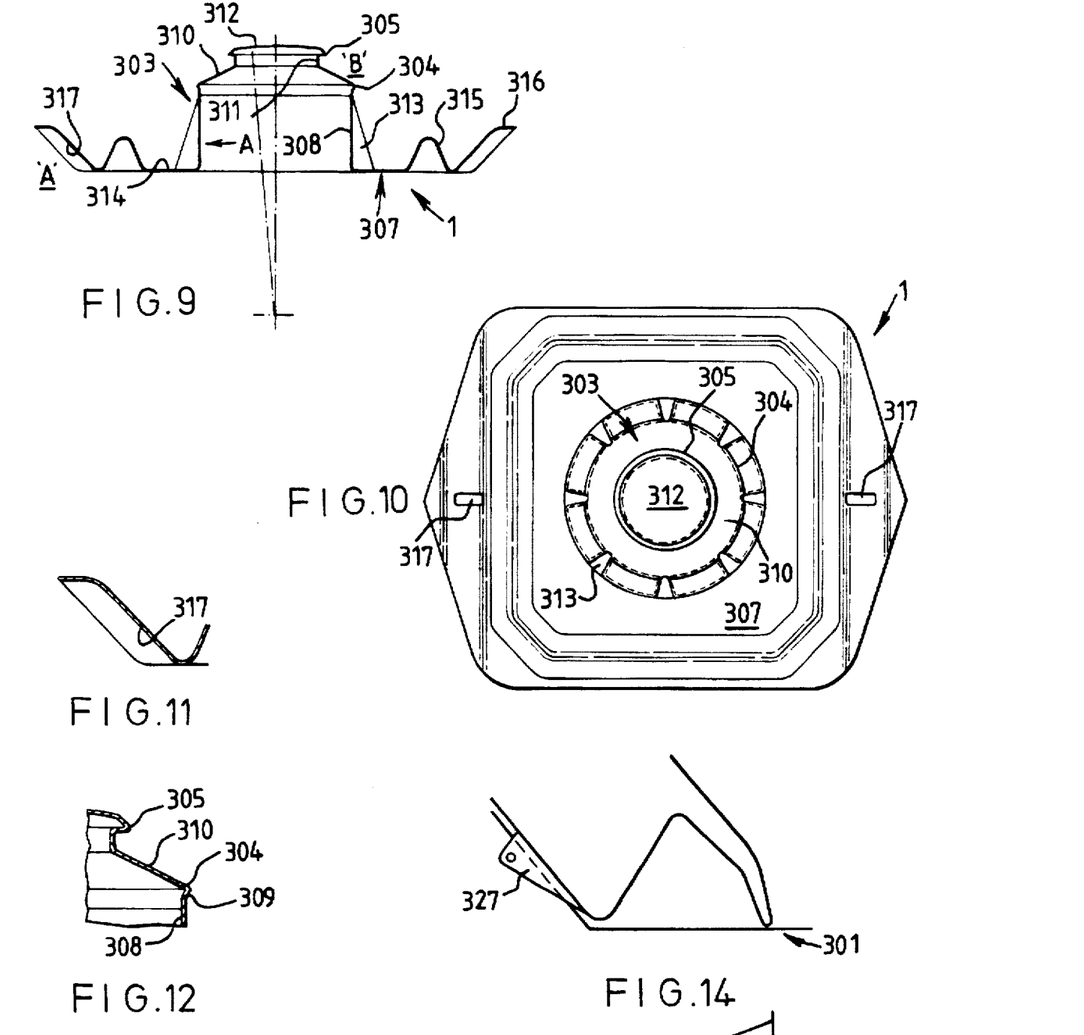
FIG. 9 is a longitudinal sectional view of a member according to the invention for retaining a further member in connection therewith.
FIG. 10 is a plan view of the member of FIG. 9.
FIG. 11 is an enlarged view of part 'A' of FIG. 9.
FIG. 12 is an enlarged view of part 'B' of FIG. 9.
FIG. 14 is an enlarged schematic view of the member of FIGS. 9 to 13 secured in position on an IBC.
Figure 13:
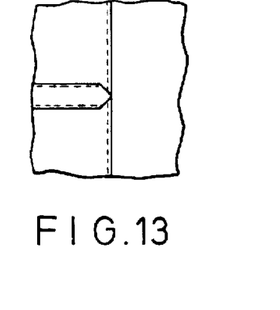
FIG. 13 is an enlarged view of an arrow 'A' of FIG. 9.
Figure 15:
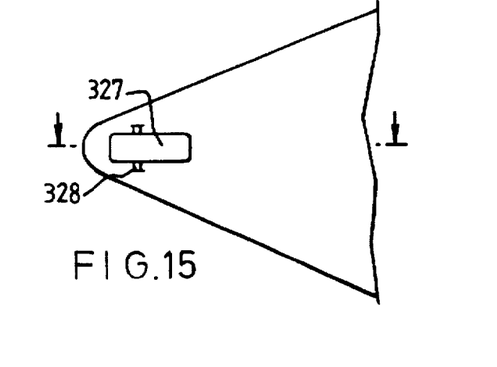
FIG. 15 is a plan view of the arrangement of FIG. 14.

The body has a major diameter wall 308 rising from the flange 307 to the projection 304 which is a first projection in the form of a shoulder part or nose, having an upwardly inclined surface 309 extending in the embodiment at 60° to the horizontal. The projection 304 then leads to an inclined surface 310 which in turn leads to a minor diameter wall part 311 of the body 303, which itself leads to the second projection 305, which is a shoulder part of the minor wall part 311, the second projection 305 being of less diameter than the first projection 304. The second projection 305 leads to a convex or domed cap or closed end 312 of the body, the volume below the cap encompassed by the walls 308, 311 being hollow, the major wall having a plurality (eight) of V-shaped vertical recesses 313 for strength.

The flange 307 has an annular part 314 leading from the wall 308 to an annular V-shaped profile 315 which in turn leads to an upturned (as viewed, FIG. 9) peripheral annular inclined flange 316 which has a slot, cut-out or through aperture 317 formed in it by say stamping or forming to provide securing means for the member 301.

Figure 19:
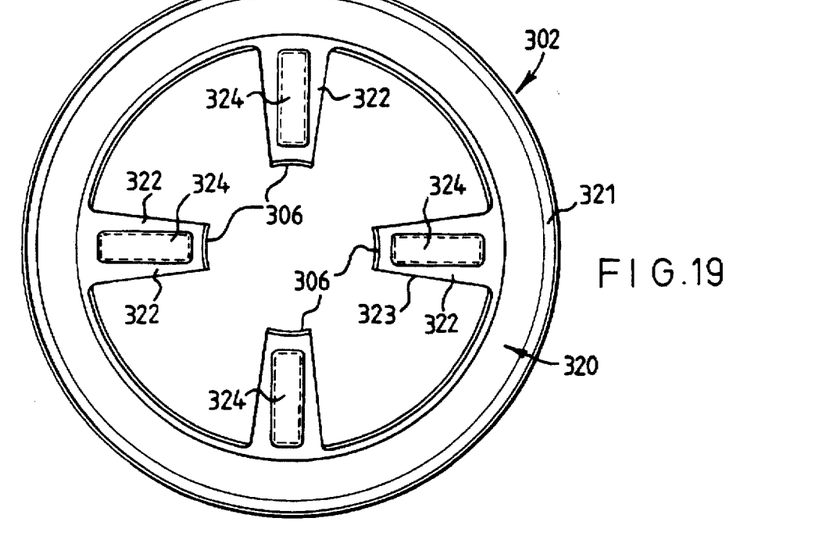
FIG. 19 shows a plan view of the further member, in the form of a clamping ring as shown schematically in part in FIGS. 9A to 9C and 10.
Figure 20:
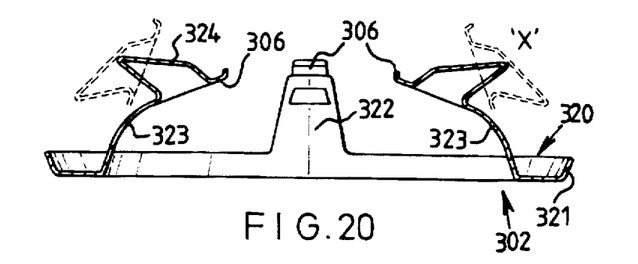
FIG. 20 shows a transverse sectional view of the member of FIG. 19.
Figure 21:
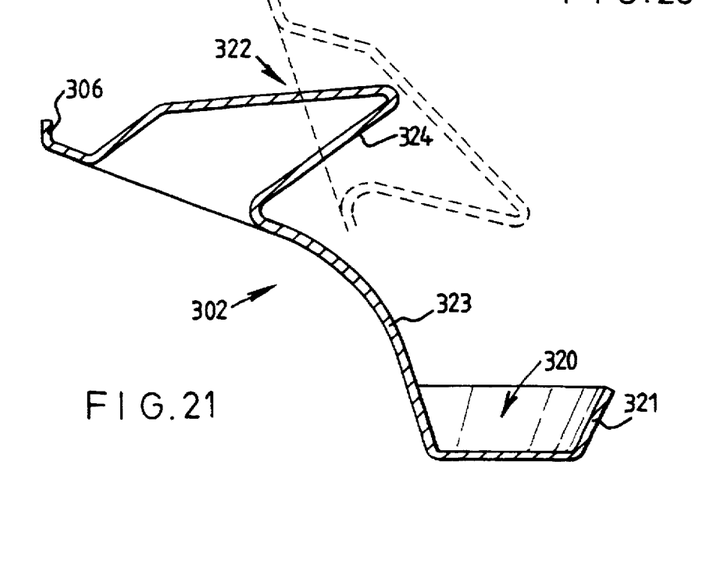
FIG. 21 shows to an enlarged scale, the part 'X' of FIG. 20.

The member 301 forms a transport cap for an IBC 318. The further member 302, shown in FIGS. 19 to 21, is a clamping ring for a closure device 319 (FIG. 16) of the IBC 318. The further member 302 has an annular rim or flange 320, with an upturned peripheral lip 321. Rising from the flange is a plurality, four in the embodiment, of latch means 322 having at a free end the latch parts 306. The further member 302 is integrally formed from a suitable material such as metal or plastic so the latch means 322, each comprising a curved arm 323 with a latch or nose 324 integrally formed therein which projects outwardly of the further member 302, are inherently resilient. In other words, the arms 323 are springy. The arms 323 are normally in the solid line position shown in FIGS. 20 and 21, but are movable to the dashed line position shown in those Figures in use to latch a closure device in position, as will be described.

Figures 16, 17, 18A, 18B, 18C:
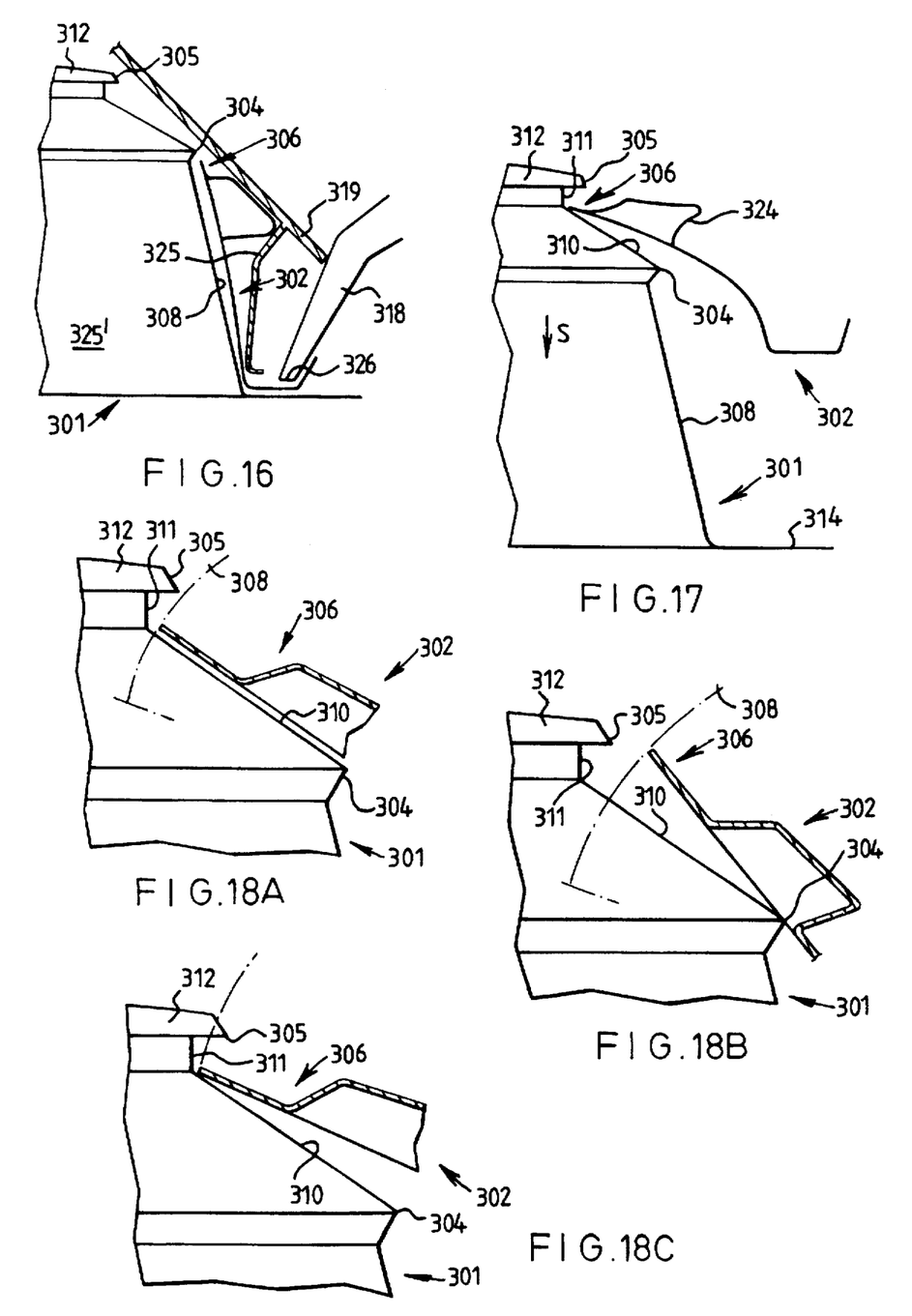
FIG. 16 shows an enlarged schematic sectional view of the member of FIGS. 9 to 15 connected with a further member to provide an assembly according to the invention, the further member comprising a clamping ring for a conical or frusto-conical closure device of an outlet of an IBC.
FIG. 17 shows part of FIG. 16 enlarged.
FIGS. 18A and 18B show respective states in the connection of the assembly to a cone closure device.
FIG. 18C shows an enlarged view of an assembly operation.

The latch means 322 are used to retain the closure device 319 in a closed (obturating) position in an outlet opening 325' of an IBC 318 by the arms 323 flexing to engage the noses 324 behind a retaining shoulder 325 of the closure device 319, as shown in FIG. 16.

The locking is achieved by utilising an assembly of the member 301 and further member 302. This is achieved by offering up the cap 312 of the body 303 of the member 301 to the opening defined by the flange 320 of the further member 302. As the member 301 is pushed into the further member (or cone clamp) 302, the second projection 305 engages the arms 323 and pivots them in a direction away from the body 303, until they clear the projection 305, when the arms 323 spring back so that the noses 324 are each below the second projections 305.

Pulling the member 301 down in the opposite direction to the insertion direction (arrow 'S' in FIG. 17) engages the latch parts 306 positively in the recess under the second projection 305. The further member or cone clamp ring 302 is thus fully connected to the member (or transport cap) 301 and retained therewith fully connected to the member (or transport cap) 301 and retained therewith permanently to form an assembly, the cone clamp ring 302 being centrally located so that the assembly can be inserted manually or by machine. The two members 301 and 302 being permanently assembled together ensure that one is not lost, and the cone clamp ring 302 need not be touched in any procedure, as follows, in locking the conical closure device 309 in position in the IBC 318.

In such a procedure, the assembly 301,302 is offered up to the opening of the IBC, below the conical closure device. When the assembly is inserted into, or pushed up into the opening 325', the flange 320 of the further member 302 engages the free edge of a bottom 326 of a wall defining the hopper outlet 325'. The member 302 thus cannot go further up into the opening 325'. The member 301 however can, and on further lifting the arms 323 are freed from below the second projection 305 and are pivoted outwardly by the inclined surface 310 and then by the first projection 304, to engage by their noses 324 against the shoulder 325 of the closure device. The upward movement of the member 301 continues until the arms 323 spring into place under the first projection 304 so holding the noses 324 in position (FIG. 16), the latch means 306 then being retained below the surface 309 of the first projection 304 which surface 309 with the wall 308 defines a recess for receiving the latch means 306.

To remove, the reverse procedure is carried out, that is, the member 301 is pulled down so that the arms 323 which can flex inwardly clear the first projection 304 and then pivot away from the closure device 319, so freeing the noses 324 therefrom until the arms 323 are caught under the second projection 305. Further movement away from the outlet 325' removes the assembly 301, 302 as a unit therefrom.

When in position on a hopper outlet, webs 327 pass through the apertures so that securing devices such as 'R'-clips, locking pins, shackles, cables or the like 328 can be inserted, to retain the assembly in position, thereby making the assembly mounting tamper-proof.

The flange 307 being laterally triangular shaped enables the assembly to be mounted on or removed from the hopper outlet 325' of the IBC 318 manually by two operatives working from opposite sides of the IBC and so that they do not have to pass under the IBC, enhancing safety. It will also be understood that in the assembly 301, 302 the cone clamp ring 302 (further member) is not touched by the operatives, and the outer flange 307 is not used for clamping the assembly, but for tamper-proof mounting on the IBC. It can thus be understood that a member 301 and assembly 301,302 as described herein with reference to the drawings provides a simple yet effective apparatus for closing off an outlet opening of an IBC whilst simultaneously securely locking a closure device, or valve, in position in that outlet, the whole assembly being able to be mounted on an removed from an IBC manually by two operatives working from opposite sides of the IBC.

Referring now to FIGS. 22 to 27 of the drawings there is shown a member 401 which is adapted to be mounted at an aperture 402 of a container 403 for flowable material (not shown) and which has means 404 resiliently to engage a closure 405 of the aperture 402 whereby to clamp the closure 405 in the aperture.

The aperture 402 is an outlet of a hopper bottom of the container 403 defined by a wall 406. The aperture 402 is normally closed by the closure 405, which is a conical member the apex of which points into the container and the base 407 of which sits on the wall 406, normally to close the aperture 402 until material in the container above and sitting on the cone 405 is to be discharged. Until then, the cone 405 should not be dislodged, for example during transit.

The member 401 achieves this. It is made in one piece from plastic and has a circular body 408 from which project, in the embodiment illustrated, three equidistantly spaced latch means each comprising an arm 409 and a nose 410. The arms 409 are inherently flexible and resilient, and normally they take up a position as shown in dashed lines in FIGS. 22 and 23.

In order to clamp the cone 402, the member 401 is offered up to the outlet aperture 402 and inserted therein until an annulus 411 engages on the bottom lip of the wall, an upturned lip 412 of the body engaging round the lip of the wall 406.

Figures 22, 23, 24, 25, 26, 27:
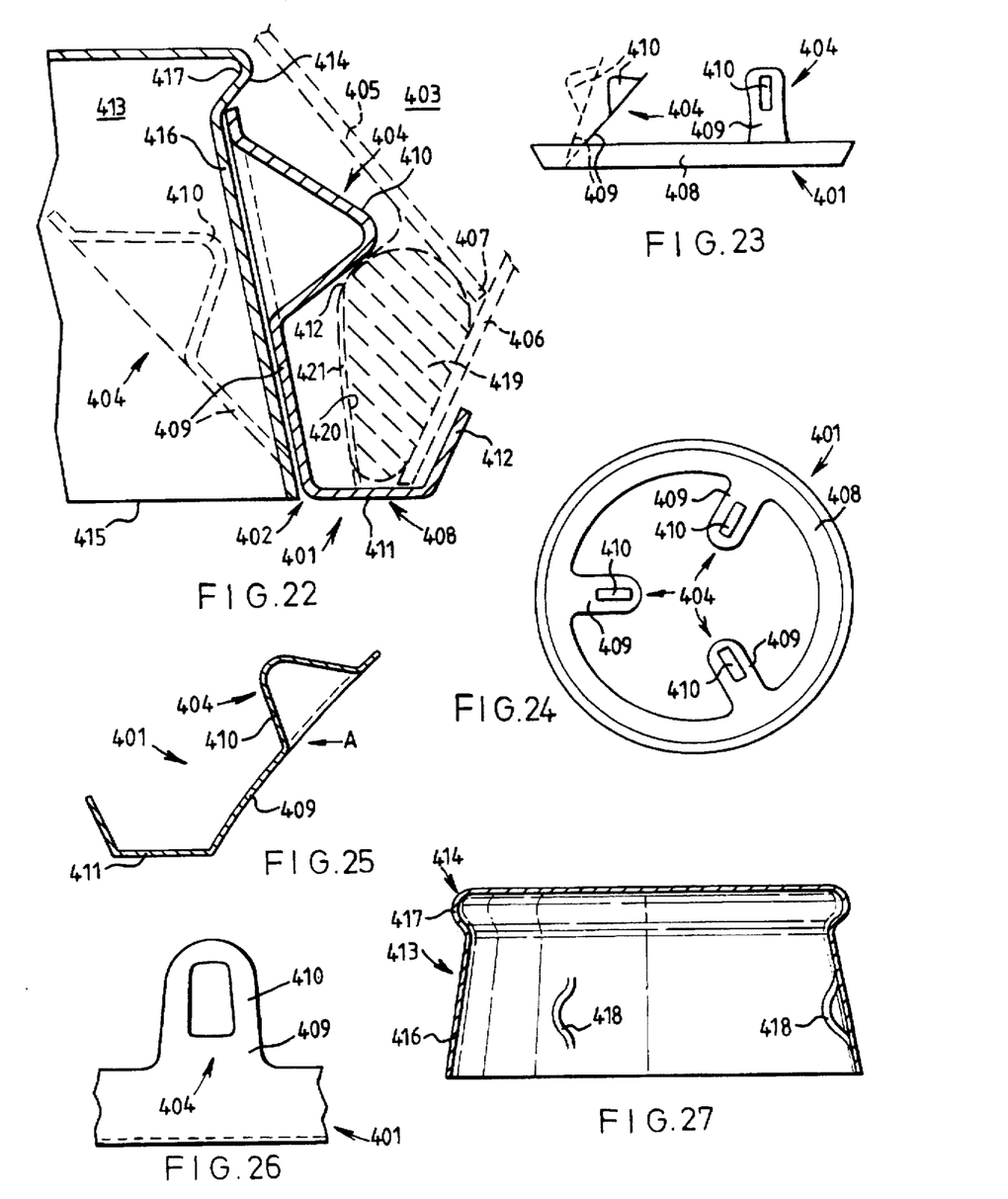
FIG. 22 is a schematic longitudinal section through part of an outlet aperture of a container used in industrial packaging of flowable material such as a powder with a member according to the invention shown in position.
FIG. 23 is an elevational view, to a smaller scale, of the member of FIG. 22.
FIG. 24 is a plan view of the member of FIG. 23.
FIG. 25 is an enlarged view of part of the member of FIG. 24.
FIG. 26 is a view on arrow 'A' in FIG. 25.
FIG. 27 is an elevational view of a cap device according to the invention.

In this position, the arms 409 are in the dashed-line position of FIG. 22, and lie opposite a shoulder 412 of the cone 405.

A device 413 is then inserted in the member 401, internally of the body 408 and into the space below the cone 405. This inserting action causes a leading part 414 of the device 413 to slide up over the arms 409 and this action automatically flexes them outwardly (as considered from the centre of the body) so that a surface of the nose 410 engages the shoulder 412, as shown in full line position in FIG. 22.

When the device 413 is fully inserted its lower (as viewed) edge 415 is in line, more or less, with the bottom of the wall 406 so that the whole of the inner volume below the cone 405, and the external surface of the cone, is protected from contamination.

Importantly too, the skirt 416 of the device 413 extends along the whole length of the arms 409, so providing a firm support therefor and preventing the arms from pivoting away from the cone 405, a natural tendency owing to the inherent resilience thereof. Likewise, an upper overhang or ledge 417 of the device 413 prevents the nose 410 from lifting off the shoulder 412. The cone 405 is thus firmly clamped in position by the latch means 404.

When it is desired to remove or raise the cone 405 the device 413 is pulled out, either with an inflatable tire-like device, or manually.

For manual operation, the device 413 may be formed with handles 18 on the inside, as shown in FIG. 27.

The cone 405 itself includes a cone seal 419 which is suitably an elastomeric ring housed in a groove 420 in a skirt 421 of the cone 405. The ring 419 is removable, and the cone 405 itself is made of plastic so that it is light and can be deformable to engage in the aperture 402 and be flexed into position.

I claim:

1. A clamping device for clamping a closure device in an aperture of a container for flowable material, comprising:

a first member including a body having first and second projections spaced apart along a longitudinal direction of the body; and a second member having latching means for engaging a portion of the closure device to clamp the closure device in the aperture, wherein the latching means and the first and second projections cooperate to retain the second member on the first member.

2. A device according to claim 1, wherein the first and second projections project laterally from the body.

3. A device according to claim 1, wherein each of the first and second projections comprises an annular ring-like projection formed integrally with the body.

4. A device according to claim 3, wherein the body is generally cylindrical, the first projection includes a shoulder part of a major diameter wall of the body and the second projection includes a shoulder part of a minor diameter wall of the body.

5. A device according to claim 4, wherein the second projection leads to a cap of the body.

6. A device according to claim 5, wherein the cap has a convex outer surface.

7. A device according to claim 1, further comprising a lateral extension flange of the body.

8. A device according to claim 7, wherein the lateral extension flange has an upturned periphery including securing means.

9. A device according to claim 8, wherein the securing means comprises through holes.

10. A device according to claim 1, wherein the latching means includes resilient latch members for engaging both the first and second projections.

11. A device according to claim 10, wherein the latch members are equidistantly spaced.

12. A container for flowable material comprising an aperture and a closure device clamped in the aperture by the clamping device according to claim 1.

* * * * *